Figures 1, 2:
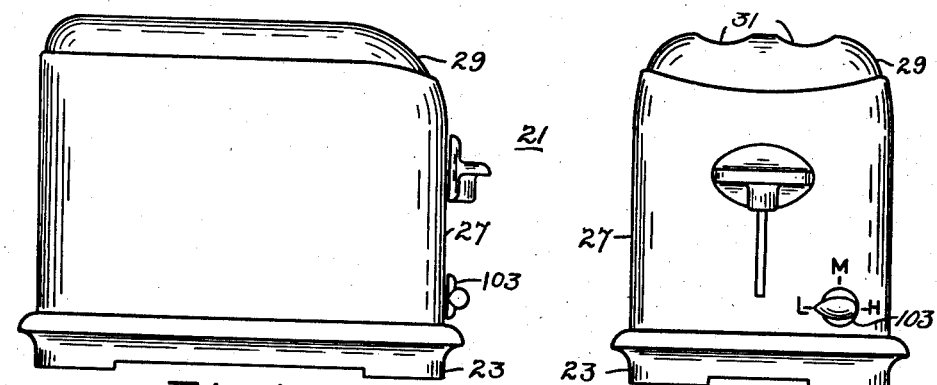

Nov. 11, 1941.　　　H. L. OLSON　　　2,262,297
TOASTER CONTROL MEANS
Filed June 27, 1940　　　3 Sheets-Sheet 1

INVENTOR
HENRY L. OLSON
BY
ATTORNEY

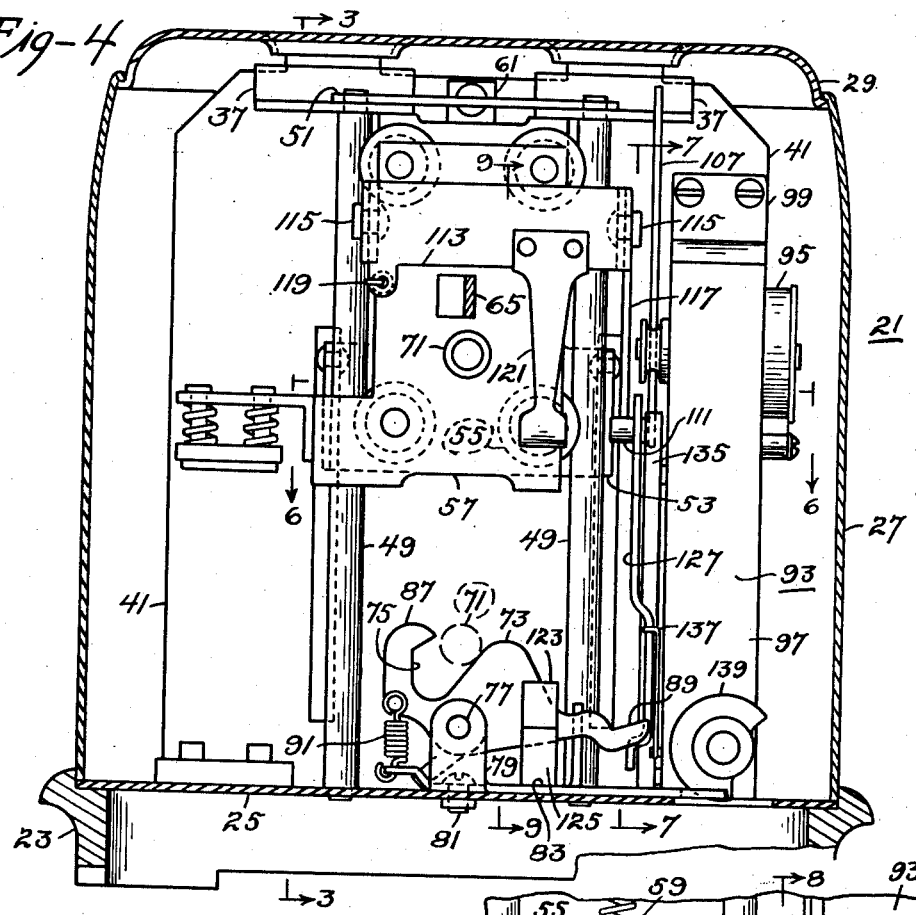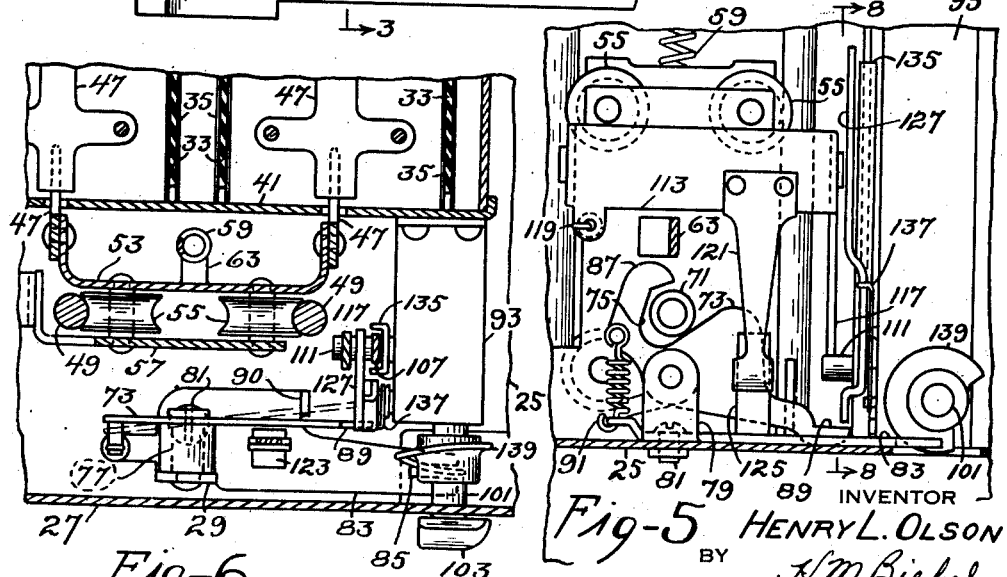

Nov. 11, 1941.  H. L. OLSON  2,262,297
TOASTER CONTROL MEANS
Filed June 27, 1940  3 Sheets-Sheet 3
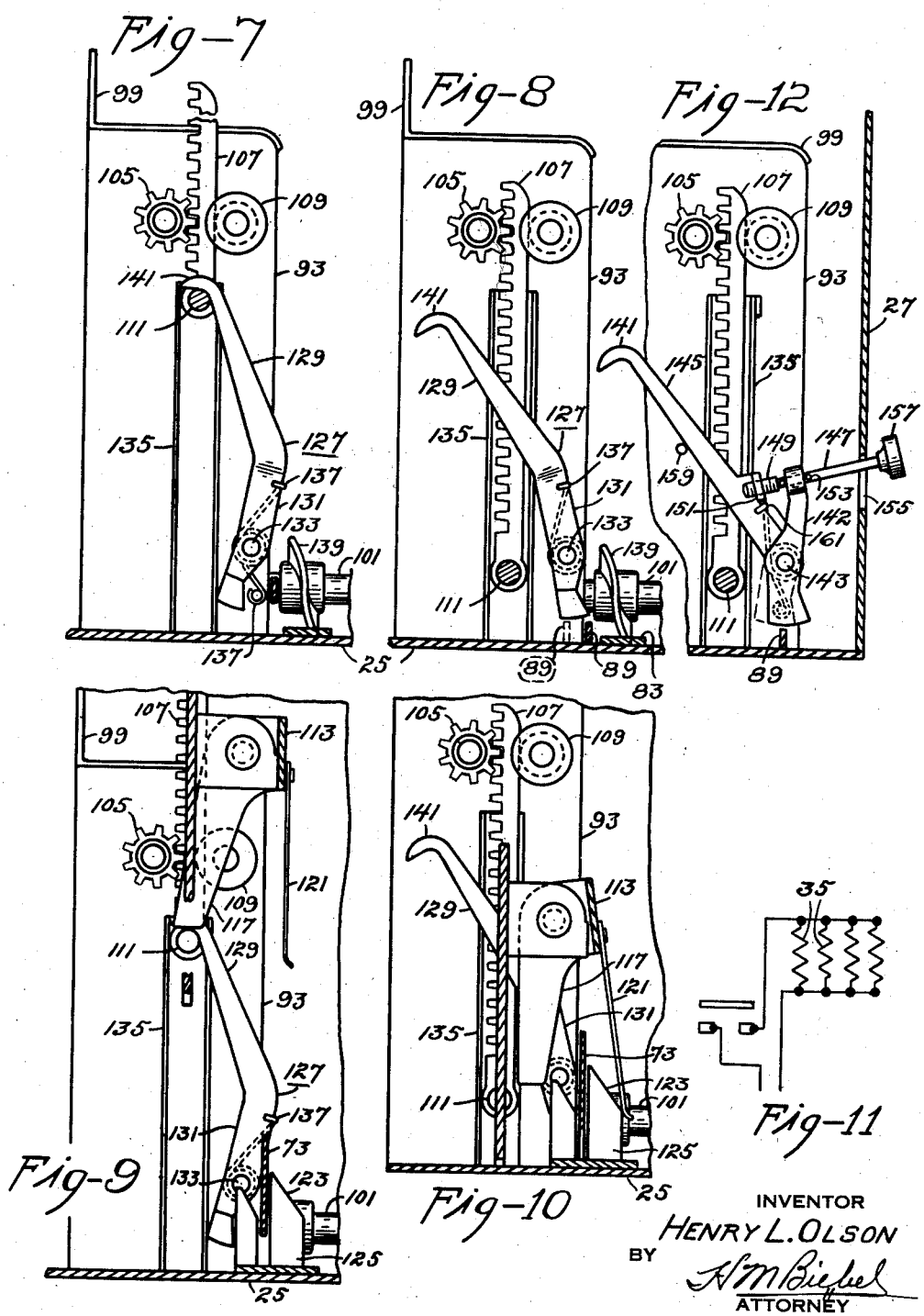
INVENTOR
HENRY L. OLSON
BY
ATTORNEY Patented Nov. 11, 1941

2,262,297

UNITED STATES PATENT OFFICE 2,262,297

TOASTER CONTROL MEANS

Henry L. Olson, Elgin, Ill., assignor to McGraw Electric Company, Elgin, Ill., a corporation of Delaware Application June 27, 1940, Serial No. 342,630

13 Claims. (Cl. 161—16)

My invention relates to automatic electric toasters and particularly to control means therefor.

An object of my invention is to provide a relatively simple and easily operable means for varying the duration of operation of a timer terminating a toasting operation.

Another object of my invention is to provide a relatively simple and efficient means whereby the effect of excessively low or excessively high supply circuit voltages to which a toaster may be connected can be counteracted.

Other objects of my invention will either be apparent from a description of one form of structure embodying my invention or will be pointed out in the course of such description and set forth in the appended claims.

Figure 3:
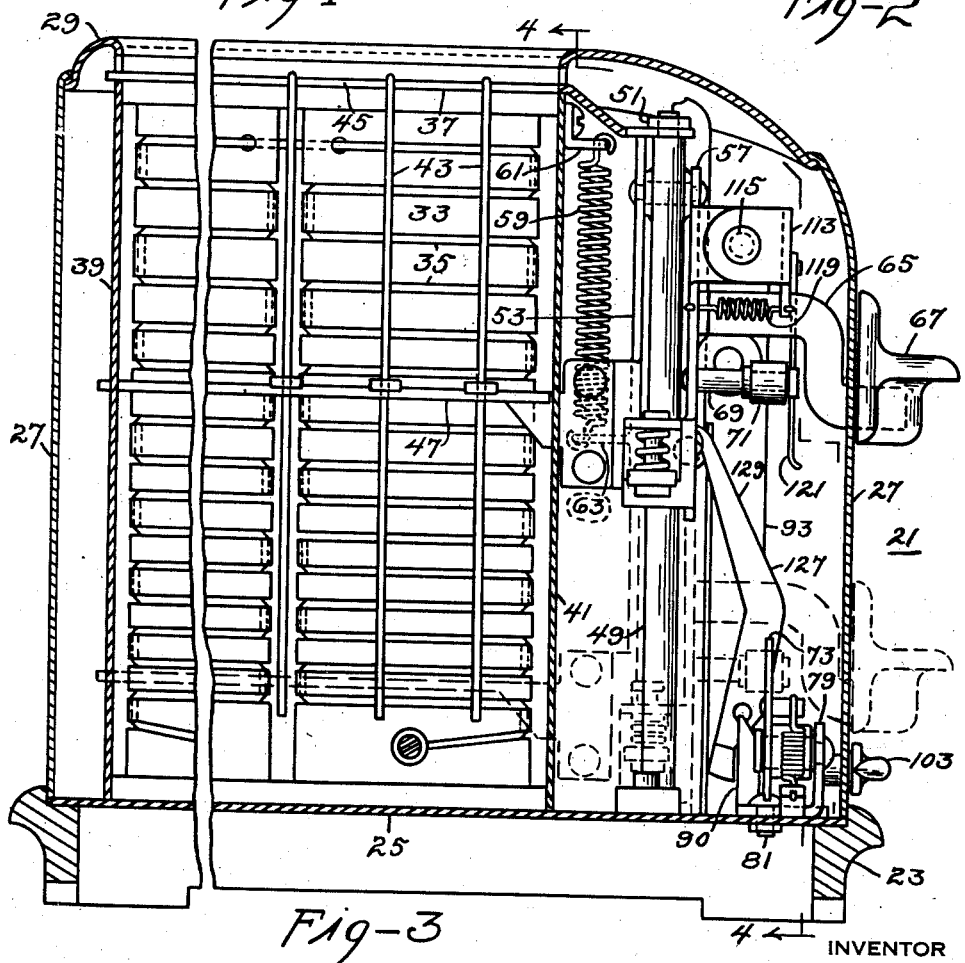

In the drawings:

Figure 1 is a side elevational view of a toaster embodying my invention, shown on a reduced scale, Fig. 2 is a front elevational view of the toaster shown in Fig. 1 and on substantially the same scale, Fig. 3 is a vertical longitudinal sectional view through the toaster taken on the line 3—3 of Fig. 4, Fig. 4 is a lateral vertical sectional view therethrough taken on the line 4—4 of Fig. 3, Fig. 5 is a fragmentary view taken on the line 4—4 of Fig. 3 but showing only some of the parts shown in Fig. 4, Fig. 6 is a horizontal sectional view taken on the line 6—6 of Fig. 4, Fig. 7 is a fragmentary view showing particularly a timer used by me and certain cooperating parts, this view being taken on the line 7—7 of Fig. 4 and showing the parts in non-toasting positions, Fig. 8 is a view similar to Fig. 7 but showing the same parts just before the start of a toasting operation, Fig. 9 is a fragmentary view to show certain parts in non-toasting positions and taken on the line 9—9 of Fig. 4, Fig. 10 is a view substantially like Fig. 9 with the parts shown in different positions, Fig. 11 is a diagram of the electric circuit of a toaster, and, Fig. 12 is a view similar to Figs. 7 and 8 but showing a modified form of my invention.

An automatic electric toaster, designated generally by the numeral 21, may comprise a skeleton base frame 23 which may be made of any suitable moulded composition and which may have mounted adjacent to the upper surface thereof a metallic bottom plate 25. A casing for the toaster may comprise an open top and open bottom sheet metal housing 27, the lower edge of which housing may rest upon the plate 25 and be secured thereagainst in any suitable or desired manner not shown in the drawings. The casing may include also a top or cover member 29 which may be provided with one or more slots 31 therein through which slices of bread to be toasted may be inserted into the toasting chamber of the toaster and through which also the pieces of toast may be removed after completion of the toasting operation.

The toaster comprises also a plurality of vertically-extending planar heating elements each including one or more sheets 33 of mica having wound thereon a strip or wire 35 of suitable resistance material. The lower edges of these sheets of electric-insulating material may be held in any suitable or desired manner as by interfitting with the bottom plate 25 and the upper ends thereof may also be held in any suitable or desired manner already well known in the art. These holding means for the upper edges of the heating elements may include top frame plates 37 extending longitudinally of the toaster, which frame plates may have interfitting engagement with a rear intermediate wall 39 and a front intermediate wall 41. I provide also a plurality of vertically-extending guard and guide wires 43 which may depend from the frame plates 37. I have illustrated a two-slice toaster and in this case there will be two slots 31 and two registering slots 45 in the two top frame plates 37.

I have shown a two-slice toaster for illustrative purposes only and do not desire to be limited thereto. I have illustrated these parts in order to show a fully operative electric toaster of the oven-type and reference may be had to Ireland Patent No. 2,001,362 for details of these structural parts.

I provide further bread carriers 47 the number of which is equal to the number of slots 31, which bread carriers are vertically movable in the toasting chamber defined by the rear intermediate wall 39, the front intermediate wall 41 and the two outermost vertically-extending heating elements and it may be here noted that I prefer to provide a pair of such spaced heating elements for each slice of bread to be toasted simultaneously. The rear ends of the bread carriers may extend through slots in the rear intermediate wall 39 while the front ends of the carriers may extend through similar slots in the front intermediate wall so that the carriers may move from the position shown in Fig. 3 of the drawings, which is their non-toasting position, to the lower position shown in broken lines in Fig. 3 of the drawings, which is their toasting position.

Means for causing such vertical movement may comprise a pair of spaced vertically-extending rods or studs 49, the lower ends of which may interfit with base plate 25 while the upper ends thereof may interfit with front end portions of the top frame plates 37, a lateral bar 51 being also provided to strengthen the holding means for the upper ends of the studs. The forward end portions of the carriers 47 may be connected by a plate 53 of substantially channel-shape which may have mounted thereon a plurality of rollers 55 adapted to fit inside of the studs 49 to reduce the friction when the bread carriers are moved either vertically upwardly or downwardly.

A carriage plate 57 is provided and is positioned in front of the rollers 55 and it may be pointed out that I prefer to provide two pairs of rollers 55 as shown in Fig. 4 of the drawings, which rollers may be mounted on studs secured to and extending between members 53 and 57. Means for biasing the bread carriers and the parts connected therewith to their upper positions may comprise a tension coil spring 59, the upper end of which may be connected to a bracket 61 secured against the front intermediate wall 41 just below the top frame plates, while the lower end of this spring may be connected to a lug 63 secured to or constituting a part of member 53. Member 57 may be provided with a forwardly-extending bar 65 which may project outwardly through the front wall of casing 27, through an elongated slot therein and may have an actuating knob 67 secured thereon in front of the front wall of casing 27 whereby an operator may cause downward movement of the bread carriers 47 into toasting position to initiate a toasting operation.

The carriage plate 57 may have mounted thereon a short stud 69 to extend outwardly thereof, which stud may have mounted thereon adjacent its front end, a roller 71. When the carriage is moved downwardly, as hereinbefore described, this roller 71 is adapted to operatively engage a latch member 73 and to enter a slot 75 therein. The latch member 73 is pivotally mounted as on a pin 77 supported by a bracket 79 which bracket is pivotally mounted on and held movably against the base plate 25 by a headed stud 81 whereby turning movement in a horizontal plane of the latch member 73 and of the bracket 79 will be permitted. The bracket 79 includes further a horizontal extension 83 of generally bar-shape which extension projects in the right-hand direction from pivot member 81 and which has a slot 85 therein at its right-hand end. Latch member 73 includes particularly a hook member 87 at its left-hand end and an extension 89 of latch 73 is adapted to overlappingly engage and interfit with a detent member to be hereinafter described in detail. Extension 83 has a vertical lug 90 thereon to assist in holding latch member 73 in the desired alignment. Latch member 73 is normally yieldingly biased in a counterclockwise direction by a spring 91 connected thereto and to a left-hand extension of member 83. When roller 71 is moved downwardly, as hereinbefore described, it will enter slot 75 and engage the right-hand sloping wall thereof, as shown in Fig. 4 of the drawings, whereby turning movement of latch member 73 in a clockwise direction is effected so that hook end 87 will be moved over roller 71 as shown more particularly in Fig. 5 of the drawings so that when knob 67 is permitted to move upwardly by the operator after he has moved it downwardly to the extent of its downward movement, roller 71 will be held in its lowered position to thereby hold the bread carriers in their lowered or toasting position. In this case, of course, extension 89 of the latch 73 will be in a position which is lower than that shown in Fig. 4 of the drawings and slightly higher than that shown in Fig. 5 of the drawings.

Means for determining the duration of a toasting operation or the length of time during which the bread carriers will be held in their lowered or toasting position may comprise a mechanical timer 93 which may be either of the constant speed type or it may be of the adjustable speed type disclosed and claimed in Ireland Patent No. 1,866,808 to which reference may be had for details of the construction of a mechanical adjustable speed timer of this type. A timer of this kind may include a clock spring 95 and a train of gears enclosed in a suitable casing 97. The timer may be held in its proper operative position against the base plate 25 and in front of and closely adjacent to the front intermediate wall 41 by a bracket 99, all in a manner now well known in the art. Means for adjusting the speed of operation of the mechanical timer when it is an adjustable speed timer of the kind above referred to may include a short shaft 101 having an adjusting knob 103 mounted thereon outside of the casing 27, the effect of turning movement of the knob 103 and of the shaft 101 being clearly set forth in the above mentioned Ireland patent. It may be here pointed out that turning the knob 103 in a clockwise direction causes an increase in the speed of operation of the timer and a turning movement in a counterclockwise direction will decrease the speed of operation of the adjustable speed timer.

The timer includes also a pinion 105 mounted on the same shaft as that carrying the spring 95 and a rack bar 107 engaging with the pinion 105 is vertically movable relatively to the timer, a grooved roller 109 being effective to hold the rack bar 107 in mesh with the pinion 105. The rack bar 107 has mounted thereon adjacent its lower end a laterally projecting pin 111 which has a dual purpose in the operation of the timer.

When it is desired to start a toasting operation the operator will, as has already hereinbefore been stated, press downwardly on the knob 67 to thereby move the bread carriers downwardly and a pivotally mounted bracket 113, of substantially channel shape and supported by short pins or studs 115 on plate 57, has depending therefrom at one side thereof an arm 117 which is normally adapted to engage lug 111 on the rack bar to cause downward movement of the rack bar and winding of the spring and of the timer coincident with the downward movement of the bread carriers. Bracket 113 is normally yieldingly biased by a short coil spring 119 connected thereto to hold arm 117 in engagement with lug 111 and this overlapping engagement of arm 117 will be terminated at the end of the downward movement by engagement of a spring arm 121 having one end mounted on bracket 113 with the upper inclined surface 123 of a projection 125 mounted on portion 83 of the latch member hereinbefore described. The effect of this inclined surface 123 on member 121 is to cause turning movement of the bracket 113 and therefore of arm 117 to cause it to move out of engagement with lug 111, the parts being then as shown in Fig. 10 of the drawings. This permits the wound-up spring 95 to start unwinding, which unwinding is suitably delayed by the train of gears comprising the timer it being, of course, obvious that rack bar 107 will be moved upwardly with coincident upward movement of lug 111.

The timer includes further a detent lever member 127 which comprises an upper part 129 extending angularly relatively to a lower part 131, the detent lever member being pivotally supported as by a pin 133 mounted against the front of a side portion of the timer housing 97. The lower end portion of the part 131 is of arcuate shape as shown in Figs. 7 and 8, for instance, and is adapted to be engaged by extension 89 of the latch member, to thereby hold the latch member in substantially the position shown in Fig. 5 of the drawings where the latch member will hold the bread carriers in their lowered or toasting position during the time that the timer is operating in its running-down operation and moving lug 111 upwardly. The rack bar and particularly the lower end thereof moves in a track 135 of substantially channel shape in lateral section whereby lateral movement of the lower end of rack bar 107 is effectively prevented for a purpose which will appear. The detent lever arm 127 is normally yieldingly biased in a counter-clockwise direction by a small spring 137, all in a manner well known in the art.

Referring now to Fig. 8 of the drawings, I have there illustrated the position of detent member 127 when the bread carriers have been moved to their lowermost or toasting position and the timer has been wound by the action of arm 117 on lug 111 and immediately after disengagement of arm 117 from lug 111 (as shown in Fig. 10) but before the operator has released his pressure on knob 67. As soon as he releases his pressure on knob 67, extension 89 will move upwardly into engagement with the lower end surface of portion 131 to hold the carriers in their lowered position while rack bar 107 and lug 111 are moved upwardly by the operating timer. It will be noted, from Fig. 8, that the upper portion 129 of detent lever member 127 extends angularly across the straight path of upward movement of lug 111 and further that in the position shown in Fig. 8 of the drawings, lug 111 will engage detent lever member 127 and particularly the upper portion 129 thereof a relatively short time after starting of the toasting operation and of upward movement of the lug 111.

A helical member 139 is fixedly mounted on shaft 101 and fixed thereon and may be likened to a screw thread and it is here pointed out that member 139 fits into and moves in slot 85 so that turning movement of knob 103 and therefore of member 139 thereon, will cause turning movement of part 83 of the latch structure hereinbefore described. If knob 103 is turned in a clockwise direction, portion 83 will be moved forwardly toward the front wall of casing 27 so that extension 89 may occupy the position shown in full lines in Fig. 8 of the drawings. If, on the other hand, knob 103 and member 139 are turned in a counter-clockwise direction, portion 85 will be moved rearwardly from the front wall of casing 27 and extension 89 will occupy, for instance, the position shown in broken lines in Fig. 6 of the drawings and also shown in broken lines in Fig. 8 of the drawings. It will be evident that the length of time required by the mechanical timer to cause turning movement of the pivotally mounted detent lever member 127 sufficient to effect disengagement between it and the latch member will be much less when the latch member occupies the position shown in full lines in Fig. 8 of the drawings than would be the case if it had been adjusted to occupy the position shown in broken lines in Fig. 8 of the drawings.

It is thus evident that my invention provides a relatively simple means whereby a latch member adapted to be overlappingly engaged by a pivotally mounted detent member may be adjusted to vary the length of time required for the timer causing detent-releasing movement thereof to effect sufficient turning movement of the detent to cause such release with upward movement of the bread carriers under the influence of the biasing spring 59 hereinbefore described. It may be here pointed out further that the timer may unwind completely irrespective of the time when it has caused termination of a toasting operation since the detent lever member will terminate the unwinding operation of the spring 95 only when its upper hook end portion 141 engages the lug 111 and prevents further upward movement thereof, it being of course understood that the spring 95 is subjected to some tension when not in operation.

Reference to Fig. 12 of the drawings will show a slightly modified form of my invention permitting of varying the amount of overlapping engagement between a pivotally mounted latch member movable in one plane and a pivotally mounted detent member movable in another plane extending at substantially right angles to the plane of movement of the latch member. A timer 93, which may be of the same kind as hereinbefore described for the first form of my invention, is provided with the same type or kind of rack bar having a pin 111 thereon movable in a track 135 substantially as hereinbefore described. The detent lever member provided in this form of my invention is made of two relatively adjustable parts, one a relatively short lower portion 142 pivotally mounted on a pin 143 and an upper and longer arm 145, the lower end of which is also pivotally mounted on pin 143. These two parts are adjustably fixed in position relatively to each other as by a short shaft 147 having its inner screw-threaded end 149 engaging with a screw-threaded lug 151 on arm 145, the shaft 147 extending through the upper end portion of member 142 and being held in a fixed position relatively thereto by two pins 153, although I do not desire to be limited to the use of such pins since any other means well known in the mechanical art may be used. The shaft 147 extends outwardly through a short elongated slot 155 in the front wall of toaster casing 27 and may have an actuating knob 157 mounted fixedly thereon to permit of turning the shaft 147. Arm 145 of the plural part detent lever member is biased in a counterclockwise direction against a stop pin 159 as by a biasing spring 161.

It is evident that the operator may turn knob 157 in a direction to cause the upper end of part 142 to move closer to the adjacent part of arm 145 or that he may turn knob 157 in the opposite direction and cause the upper end portion of part 142 to move away from the adjacent part of arm 145 of the detent lever member. When the operator has turned knob 157 to cause approaching movement of the upper end of part 142 to arm 145, the part 142 may have the position shown in full lines in Fig. 12. If the operator has moved knob 157 to cause the upper end of part 142 to move away from the adjacent part of arm 145, the member 142 and particularly the lower part thereof, may have been moved into the position shown by the broken lines in Fig. 12 of the drawings. If the extension 89 of the latch member occupies the position shown in Fig. 12 of the drawings and if the detent lever member and particularly the part 142 thereof occupies the position shown in Fig. 12 of the drawings when the lug 111 is in its lowered position, it is evident that while lug 111 will engage part 145 of the detent lever member relatively soon, it will require a relatively long time before lug 111 causes sufficient turning movement, in a clockwise direction, of the detent lever member to effect disengagement between portion 89 of the latch member and the lower end of part 142 of the detent member. However, if the lower end portion of part 142 of the detent member was initially adjusted to occupy the position shown in broken lines in Fig. 12 of the drawings, it is also evident that a relatively shorter time will be required before the desired disengagement between the latch member and the detent member will be effected.

It is therefore evident that even when a constant speed mechanical timer is employed, I provide means whereby the operator can vary the amount of overlapping engagement between a latch member and a detent member so that in case of a relatively low voltage of the supply circuit to which the toast heating elements are connected requiring relatively longer durations of a toasting operation, the operator can easily and quickly vary the amount of overlapping engagement between the latch and detent members to permit of relatively longer durations of a toasting operation. Also it is obvious that in case the voltage of the supply circuit to which the toast heating elements are connected is relatively high, requiring a shorter duration of a toasting operation to properly toast a slice or slices of bread, the operator may vary the amount of overlapping engagement to a much lesser amount or value so that the constant speed timer will still be effective to effect termination of a toasting operation when the desired degree of toasting has been effected.

I may further point out that when I use an adjustable speed mechanical timer of the kind hereinbefore mentioned, turning of the speed-adjusting knob of the timer will effect not only a change in the speed of the timer but will also vary the amount of overlapping engagement of the latch and of the detent members so that it is possible to compensate for or counteract the effect of relatively low supply circuit voltages and of relatively high supply circuit voltages which values in some cases, because of accidental conditions beyond the control of the operator, may be excessive.

I may further point out that the structure shown particularly in Fig. 12 of the drawings permits also of an operator effecting manually actuable termination of a toasting operation, it being only necessary for the operator to press downwardly on knob 157 to cause sufficient turning movement in a clockwise direction of the detent member hereinbefore described to cause it to move out of overlapping and holding engagement of the latch member.

While I have illustrated and described several forms of devices embodying my invention, I do not desire to be limited thereto and therefore desire that all further obvious modifications clearly covered by the appended claims shall be considered as part of my invention.

I claim as my invention:

1. Means for adjustably controlling the duration of a toasting operation of an automatic electric toaster comprising toast heating means, a bread carrier movable through fixed distances into toasting and non-toasting positions relatively to said toast heating means and normally yieldingly biased into non-toasting position, a latch member for holding said carrier in toasting position and means to move said carrier into toasting position and into operative engagement with said latch member, said duration controlling means including a timing means adapted to be conditioned by said carrier-moving means, a detent member normally out of engagement with said latch member adapted to overlappingly engage with said latch member to hold the latter in carrier-holding position and movable by said timing means to release said latch member and means to cause variation of the amount of overlapping engagement of the latch and detent member to vary the time required to effect release of the latch member from the detent member and thereby vary the duration of a toasting operation.

2. Means for adjustably controlling the duration of a toasting operation of an automatic electric toaster comprising toast heating means, a bread carrier movable into toasting and non-toasting positions relatively to said toast heating means and normally yieldingly biased into non-toasting position, a pivotally supported latch member engageable by said carrier to hold the latter in toasting position and means to move the carrier into toasting position and into engagement with said latch member, said duration controlling means comprising a timing means adapted to be conditioned for operation by said carrier moving means, a pivotally mounted detent member adapted to overlappingly engage with said latch member to hold the latter in carrier-holding position and movable by said timing means to release said latch member and manually-actuable means to move one of said members relatively to the other before engagement with each other to vary the amount of overlap of the engagement therebetween to vary the amount of pivotal movement of the detent member required to cause disengagement thereof from the latch member and thereby vary the time required to cause such disengagement.

3. Means for adjustably controlling the duration of a toasting operation of an automatic electric toaster comprising toast heating means, a bread carrier movable into toasting and non-toasting positions relatively to said toast heating means and normally yieldingly biased into non-toasting position, a pivotally supported latch member engageable by said carrier to hold the latter in toasting position and means to move the carrier into toasting position and into engagement with said latch member, said duration controlling means comprising a timing means adapted to be conditioned for operation by said carrier moving means, a pivotally mounted detent member adapted to overlappingly engage with said latch member to hold the latter in carrier-holding position and movable by said timing means to release said latch member and manually-actuable means to move said latch member relatively to said detent member before engagement with each other to vary the amount of overlapping engagement therebetween and to vary the amount of pivotal movement of the detent member required to cause disengagement thereof from the latch member to thereby vary the length of time required to cause such disengagement.

4. Means for adjustably controlling the duration of a toasting operation of an automatic electric toaster comprising toast heating means, a bread carrier movable into toasting and non-toasting positions relatively to said toast heating means and normally yieldingly biased into non-toasting position, a pivotally supported latch member engageable by said carrier to hold the latter in toasting position and means to move the carrier into toasting position and into engagement with said latch member, said duration controlling means comprising a timing means adapted to be conditioned for operation by said carrier moving means, a pivotally mounted detent member adapted to overlappingly engage with said latch member to hold the latter in carrier-holding position and movable by said timing means to release said latch member and manually-actuable means to move said detent member relatively to said latch member before engagement with each other to vary the amount of overlapping engagement therebetween to thereby vary the amount of turning movement of the detent member required to cause disengagement thereof from the latch member.

5. A device as set forth in claim 4 in which said detent moving means is manually movable to effect disengagement thereof from the latch member and termination of a toasting operation independently of the action of said timing means.

6. Means for adjustably controlling the duration of a toasting operation of an automatic electric toaster comprising toast heating means, a control switch therefor normally yieldingly biased to open position, means for moving said switch into closed position, and a pivotally-supported latch member for holding said switch in closed position, said duration controlling means comprising a timing means, a pivotally supported detent member adapted to overlappingly engage with said latch member to hold the latter in switch-closing position and movable by said timing means to release said latch members and means to move said latch member relatively to the detent member before engagement thereof with each other to vary the amount of overlapping engagement of said members and thereby vary the amount of movement of the detent member required to effect disengagement thereof from the latch member.

7. Means for adjustably controlling the duration of a toasting operation of an automatic electric toaster comprising toast heating means, a control switch therefor normally yieldingly biased to open position, means for moving said switch into closed position, and a pivotally-supported latch member for holding said switch in closed position, said duration controlling means comprising a mechanical timer adapted to be wound by the switch closing means simultaneously with the closing of the switch, a pivotally supported detent lever member adapted to overlappingly engage with the latch member to hold the latter in switch closing position and turnable by said timer to release said latch member and means to move said latch member relatively to the detent member before engagement thereof with each other to vary the amount of overlapping engagement of said members and thereby vary the amount of movement of the detent member by the timer required to effect disengagement thereof from the latch member.

8. Means for adjustably controlling the duration of a toasting operation of an automatic electric toaster comprising toast heating means, a control switch therefor normally yieldingly biased to open position, means for moving said switch into closed position, and a pivotally-supported latch member for holding said switch in closed position, said duration controlling means comprising a mechanical timer adapted to be wound by the switch closing means substantially simultaneously with the closing of the switch, a projection on said timer movable in a fixed straight path during the operation of the timer, a pivotally supported detent lever member having one portion adapted to overlappingly engage with the latch member to hold the latter in switch closing position and having another portion adapted to extend angularly across said fixed straight path and engageable by said timer projection to be turned thereby to cause release of said latch member and means to vary the amount of overlapping engagement of said members to vary the length of time required to effect release of the detent member from the latch member.

9. Means for adjustably controlling the duration of a toasting operation of an automatic electric toaster comprising toast heating means, a bread carrier movable to toasting and non-toasting positions relatively to the toast heating means and normally yieldingly biased to non-toasting position, means to move said bread carrier into toasting position and a pivotally supported latch member for holding said carrier in toasting position, said duration controlling means comprising a mechanical timer adapted to be wound by said carrier-moving means when the carrier is being moved into toasting position, a projection on said timer movable in a straight path during the operation of the timer, a two-part pivotally-supported detent member, one of said parts being adapted to extend angularly across said straight path traversed by said timer projection and the other part being adapted to overlappingly engage with said latch member to hold it in carrier-holding position and manually actuable means to vary the positions of the two parts of the detent member relatively to each other to thereby vary the amount of overlap between the latch member and the detent member and thereby vary the length of time required for the timer projection to cause sufficient turning movement of the detent member to effect release therefrom of the latch member.

10. Means for adjustably controlling the duration of a toasting operation of an automatic electric toaster comprising toast heating means, a control switch therefor, a bread carrier movable into toasting and non-toasting positions relatively to the toast heating means, means normally yieldingly biasing said switch to open position and the bread carrier into non-toasting position, means to move said bread carrier into toasting position and the switch into closed position and a pivotally supported latch member for holding said carrier in toasting position and said switch in closed position, said duration controlling means comprising a mechanical timer adapted to be wound by said carrier-moving means when the carrier is being moved into toasting position, a projection on said timer movable in a straight path during the operation of the timer, a two-part pivotally-supported detent member, one of said parts being adapted to extend angu-